UNITED STATES PATENT OFFICE.

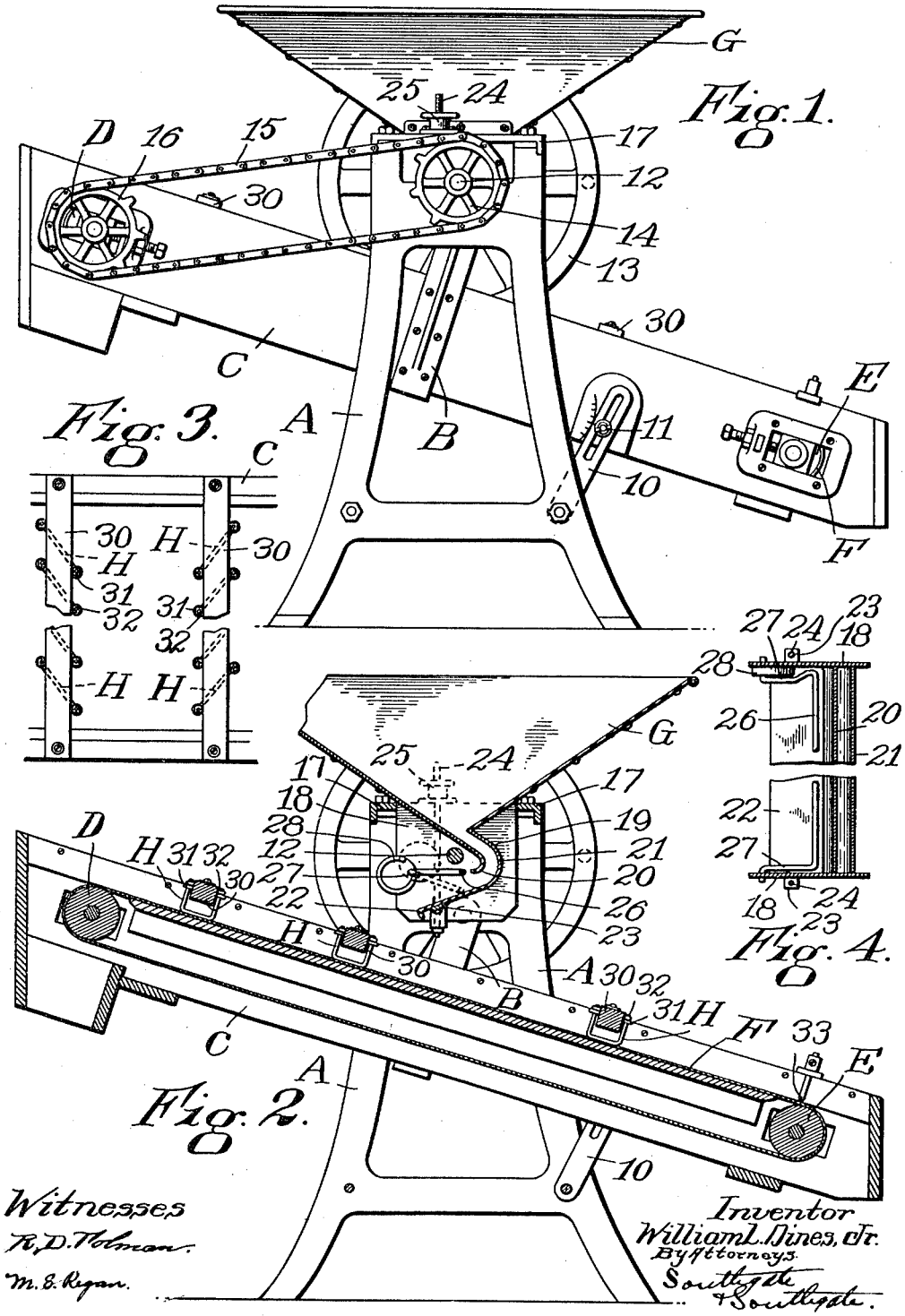

WILLIAM L. DINES, JR., OF WORCESTER, MASSACHUSETTS, ASSIGNOR TO WILLIAM L. DINES, JR., CO., OF WORCESTER, MASSACHUSETTS, A CORPORATION OF MASSACHUSETTS.

FEED-REGULATOR.

1,061,731. Specification of Letters Patent. Patented May 13, 1913.

Application filed December 22, 1911. Serial No. 667,285.

*To all whom it may concern:*

Be it known that I, WILLIAM L. DINES, Jr., a citizen of the United States, residing at Worcester, in the county of Worcester and State of Massachusetts, have invented a new and useful Feed-Regulator, of which the following is a specification.

The object of this invention is to provide a new and improved separator especially adapted for separating round coffee beans from flat coffee beans.

It is well known that round coffee beans have better flavor than flat beans, and machines have been heretofore devised for separating the round beans from the flat ones. These machines usually have consisted of a hopper in which the unsorted beans are placed, one or more rolls, agitators or other mechanism for feeding the beans from the hopper, and an inclined running apron onto which the beans are delivered and coöperating with which are spreading devices. The operation of the machine is such that the round coffee beans are run or rolled down the inclined apron, while the flat ones will be carried up and delivered over the upper end of the apron. In operating these machines it has been found that the roll or rolls and the spreader have a tendency to break or smash the beans and this as well as the other devices employed adds to the expense of manufacture, maintenance, and operation of the machine.

The object of this invention is to overcome these difficulties.

The improvement comprises an improved form of spout or delivery from the hopper which will act to deliver the beans easily and accurately on the apron, and by the employment of which the use of a roll or rolls and all mechanism that has to be driven by power is rendered unnecessary.

The improvements are illustrated in the accompanying sheet of drawings forming part of this application for patent, in which—

Figure 1 is a side elevation of a machine constructed to embody my invention; Fig. 2 is a sectional elevation thereof; Fig. 3 is a partial plan view illustrating the arrangement of spreaders; and Fig. 4 is a plan view of the stop or choking mechanism which is employed to stop the feed of the beans.

Referring to the drawing and in detail, A designates the frame of the machine, pivoted to which by arms B is an open rectangular wooden frame C which can be set in different angular positions and held in the desired adjustment by means of slotted arms 10 and nuts 11. Rollers D and E are journaled in said rectangular frame C, and running around the same is an endless apron F.

12 designates the driving shaft which is journaled in the frame, and which is provided with a pulley 13, and a handle, if desired, so that the shaft can be operated by power or by hand. On the end of the shaft is arranged a sprocket wheel 14 which communicates power by a sprocket chain 15 to a sprocket wheel 16 secured on the end of the roller D. In operation this gearing is used to drive the apron so that its upper surface will travel from right to left or upwardly as shown in the drawings.

G designates the hopper which preferably is made out of sheet iron plates riveted together. The hopper is held in position by a frame 17 to which it is secured, and which frame is secured to the main frame A. The front and rear sides of the hopper have downwardly depending plates 18 which form the end walls of the delivery trough. The side walls of the hopper are bent and shaped to form an inclined angular delivery outlet, the first part 19 of which has a lower side substantially in line with, and constituting a flat extension of the left-hand side of the hopper, and the exit 20 of which is at a sharp angle thereto, the parts 19 and 20 being connected by a curved section 21. The lower end of the exit section is extended to form a delivery lip 22. A bar 23 is riveted to this lip 22, and extending up from the ends of the bar are rods 24 which pass through the frame 17 and threaded on which are nuts 25. The delivery lip 22 by reason of being made out of sheet metal is flexible, and by adjusting the nuts 25 its inclination can be adjusted so that the feed can be adjusted for various quantities of beans.

It will be noticed that the delivery spout or trough slightly increases in size from the point where it leaves the hopper proper. I have found by experimentation that this form of delivery trough or outlet will provide an accurate means for delivering the beans smoothly and nicely onto the inclined apron, and that by slight adjustments rendered possible by the construction described, the same can be used to deliver any quantity of beans.

To stop or allow the feed a wire 26 having crank-arms 27 is pivoted in the side plates 18, and is provided with a weight 28, the center of which is so set as to hold the wire 26 in its lowered or raised position. By putting the wire 26 in its lowest position, as shown in Fig. 2, the feed is checked, and by raising the same to clear the delivery lip 22 the feed is allowed to take place.

Referring now to the form of separators or spreaders which are used in connection with the running apron, 30 designates cross-bars which are secured to the top of the rectangular frame C. These cross-bars are provided with ears 31, loosely fitted in which are the upper ends of the spreaders H which are made of wire of U-shape, their upper ends being threaded. Nuts 32 are threaded on the ends of the spreaders. By this arrangement the spreaders are normally held in position on the apron by gravity. When there is a seam the apron passes under the same, or when there is a choking of the beans under the spreader the same is free to lift, and this action will prevent the breaking of the beans. The spreaders are arranged in inclined position relatively to the apron as shown in Fig. 3, and their inclination is opposite on the end cross bars as compared with the middle cross bar. An adjustable wire 33 is also arranged close to the apron near the roll E and just in position to upset the coffee beans that come down to it on their curved sides and to allow the round beans to pass over it.

In operation the round beans will be very rapidly and accurately separated or sorted from the flat beans, and the construction of the hopper and the separators is such as practically to prevent any breaking or smashing of the beans during the operation.

The peculiar form of spreaders contribute to the action so that the separation between the flat and round coffee beans is very perfect.

The details and arrangements herein shown and described may be greatly varied by a skilled mechanic without departing from the scope of my invention as expressed in the claims.

Having thus fully described my invention, what I claim and desire to secure by Letters-Patent is:—

1. As an article of manufacture, a hopper, and a stationary flat delivery chute extending substanitally across the bottom of the hopper and curving downwardly and reversely therefrom, and having on the reverse portion thereof a flat sheet metal delivery lip normally stationary but adjustable up and down independently of the body of the chute.

2. As an article of manufacture, a hopper having slanting lower sides bent to form an angular delivery outlet, the lower side of the upper part of which is flat and substantially in alinement with the plane of one of said slanting sides, said delivery having a sharply curved section and a flat mouth slanting at a sharp angle to the upper part, the lower end of the mouth having a flat delivery lip extending beyond the end thereof and in the plane of the lower side of said mouth.

3. In a device of the class described, a hopper having an inclined angular delivery outlet, and means for controlling the feed therethrough, consisting of a wire or rod crank-armed and journaled so that the same can be moved into and out of position.

4. In a device of the class described, a hopper having an inclined angular delivery outlet, and means for controlling the feed therethrough, consisting of a wire or rod crank-armed and journaled so that the same can be moved into and out of position, and a weight for holding the rod in its operative or inoperative positions.

In testimony whereof I have hereunto set my hand, in the presence of two subscribing witnesses.

WILLIAM L. DINES, Jr.

Witnesses:
E. M. ALLEN,
ALBERT E. FAY.